W. J. KNOX.
GASEOUS OZONIDS AND THEIR PRODUCTION.
APPLICATION FILED DEC. 2, 1911.
1,081,617.
Patented Dec. 16, 1913.
5 SHEETS—SHEET 4.
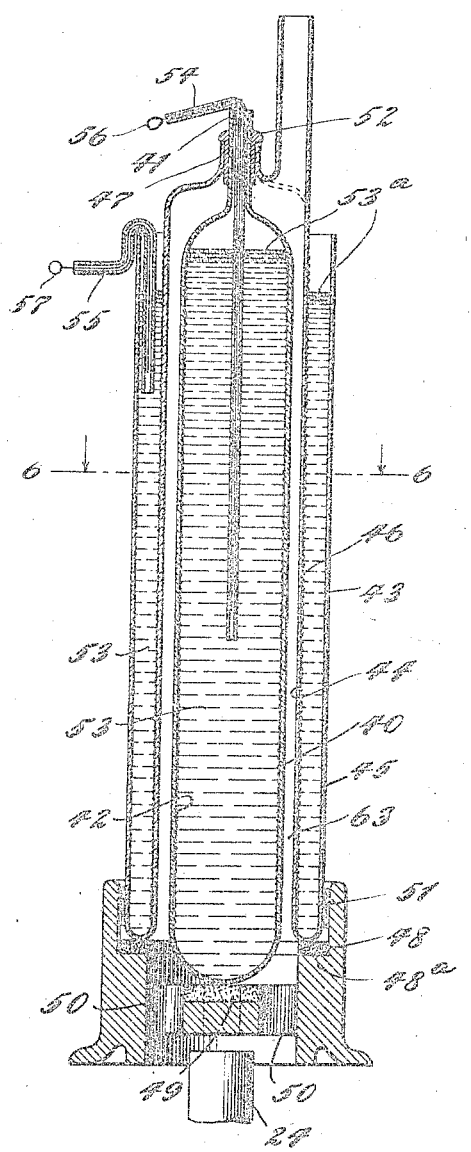
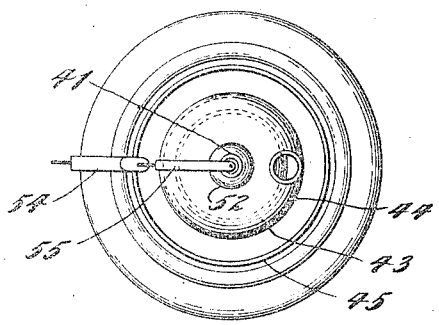
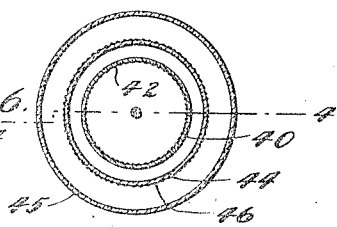
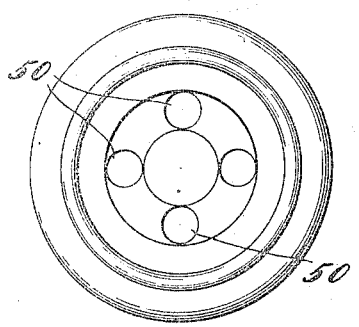
WITNESSES:
INVENTOR
William John Knox
BY Gifford Bull
his ATTORNEY W. J. KNOX.
GASEOUS OZONIDS AND THEIR PRODUCTION.
APPLICATION FILED DEC. 2, 1911.
1,081,617.
Patented Dec. 16, 1913.
5 SHEETS—SHEET 5.
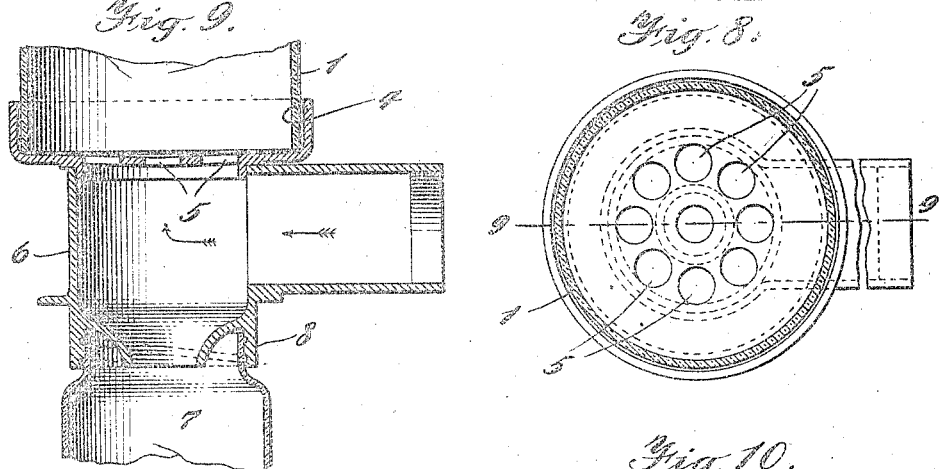
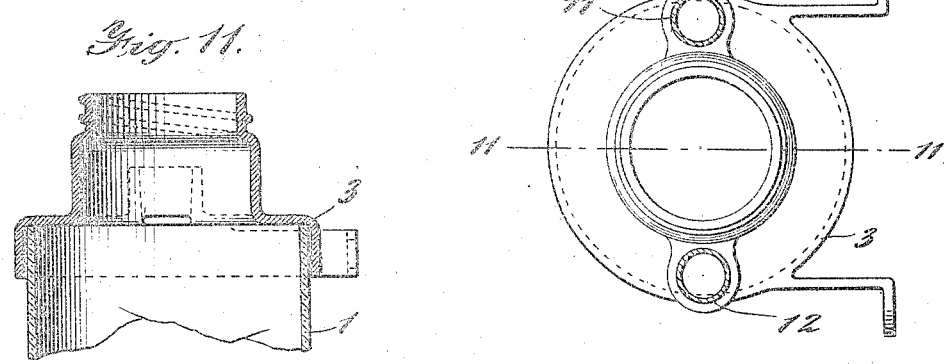
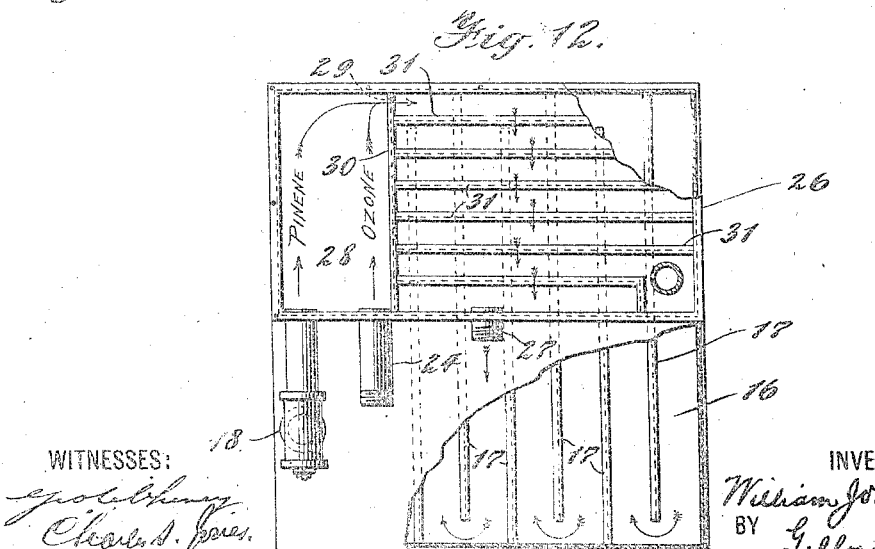
WITNESSES:
INVENTOR
William John Knox
BY Gifford & Bull
his ATTORNEYS

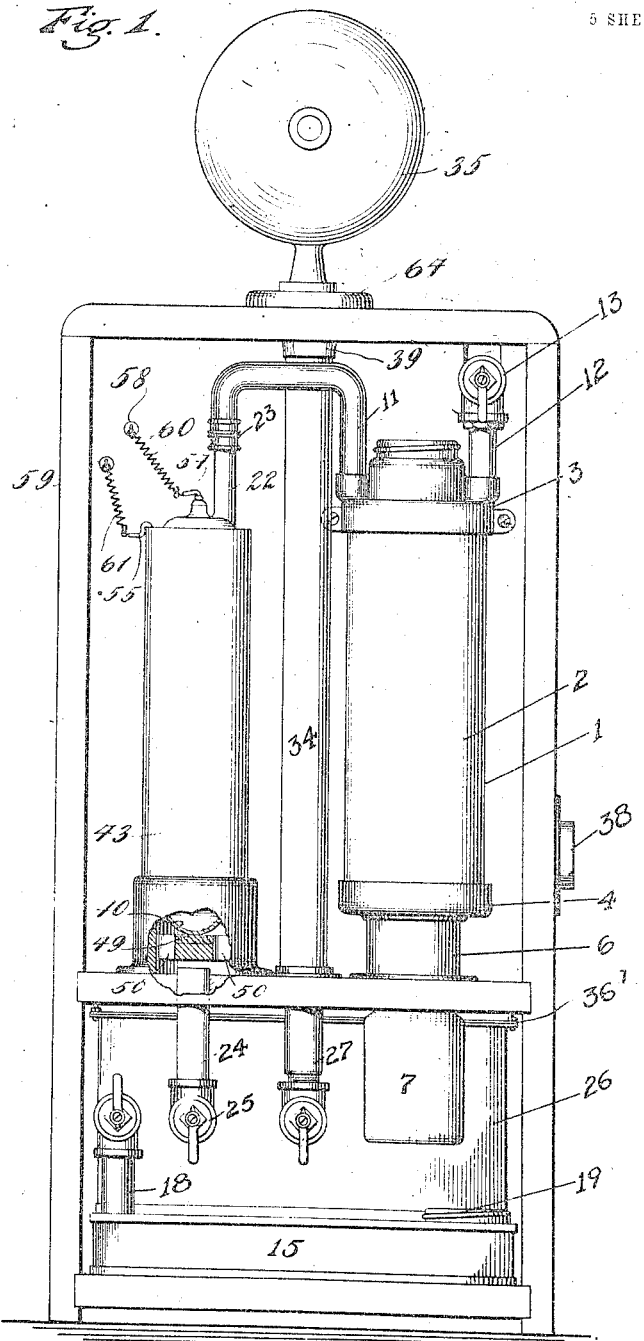

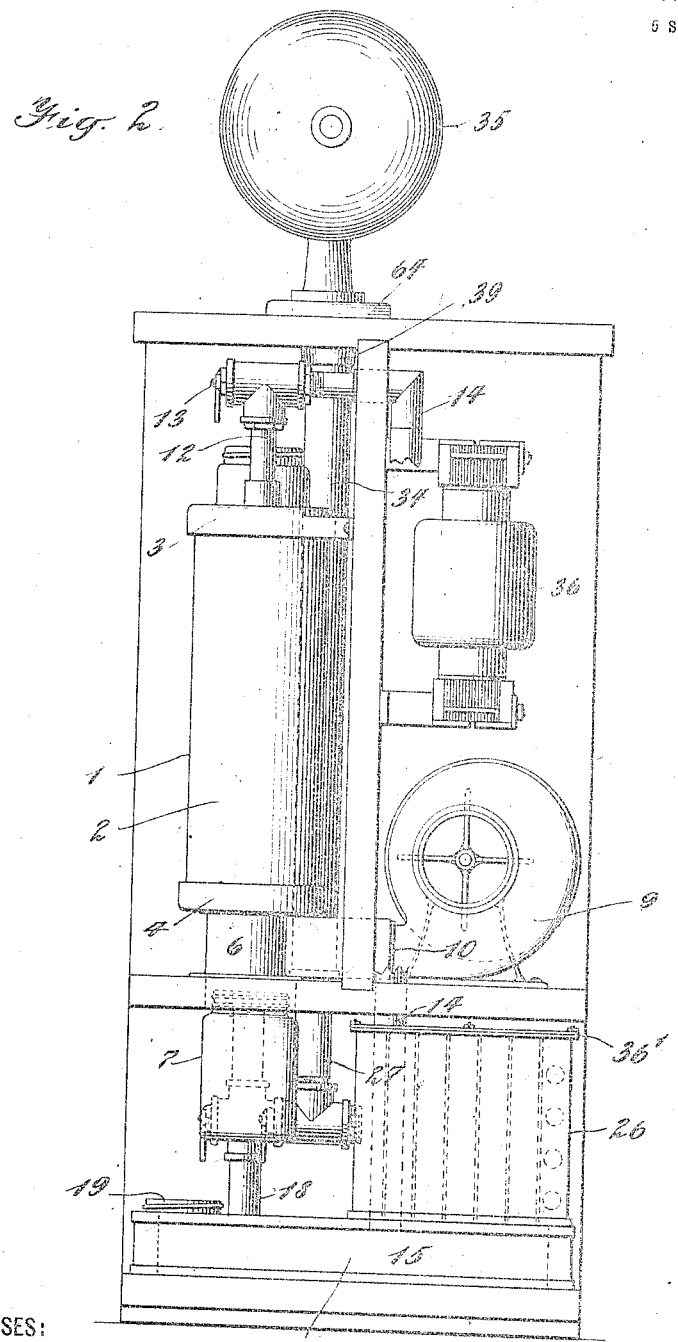

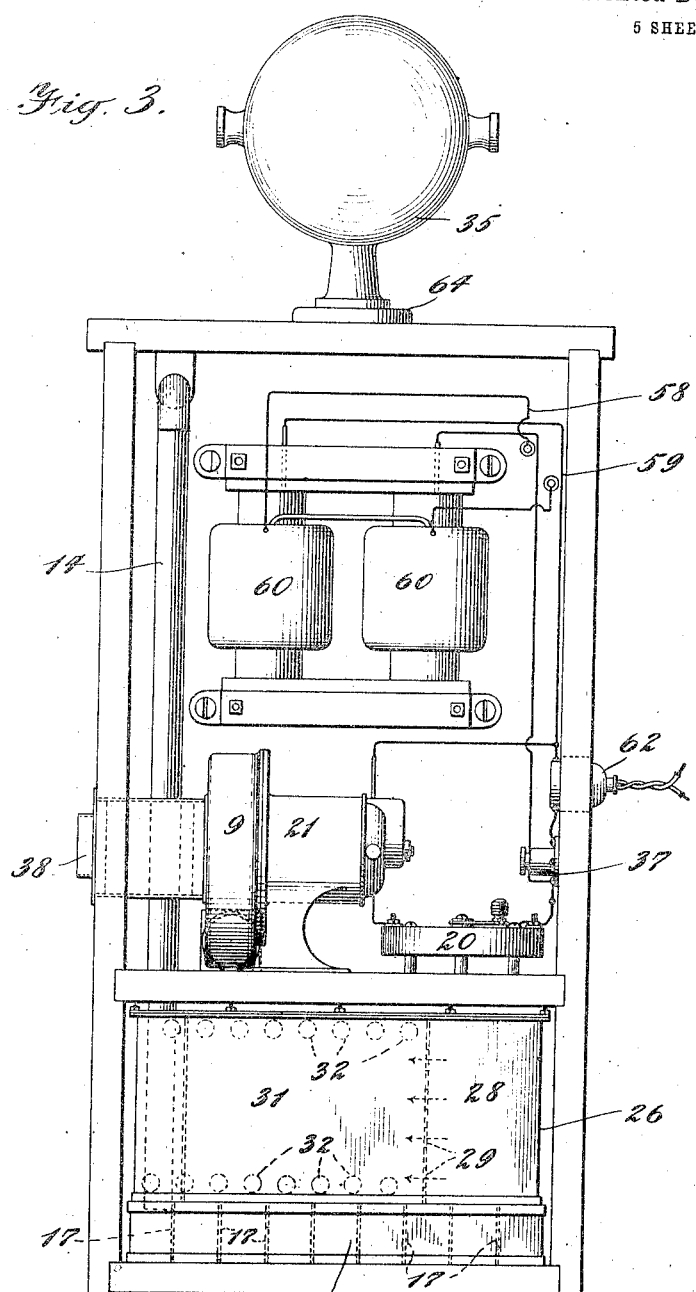

UNITED STATES PATENT OFFICE.

WILLIAM JOHN KNOX, OF NEW YORK, N. Y., ASSIGNOR TO KNOX TERPEZONE COMPANY OF AMERICA, A CORPORATION OF WEST VIRGINIA.

GASEOUS OZONIDS AND THEIR PRODUCTION.

1,081,617. Specification of Letters Patent. Patented Dec. 16, 1913.

Application filed December 2, 1911. Serial No. 663,602.

*To all whom it may concern:*

Be it known that I, WILLIAM JOHN KNOX, a citizen of the United States, and a resident of New York city, borough of Manhattan, in the county of New York and State of New York, have invented certain new and useful Improvements in Gaseous Ozonids and Their Production; and I do declare the following to be a full, clear, and exact description of the invention, such as will enable others skilled in the art to which it appertains to make and use the same.

The object of my invention is to produce gaseous ozonids, and comprehends the method of production, the apparatus therefor, and the application of the vapor to therapeutic and technical uses.

My invention comprehends the chemical union of ozone with an ozonizable substance by first vaporizing the latter and subsequently commingling this vapor and ozone. The molecules of the unsaturated substance in this vapor condition are widely separated in space, as are the ozone molecules and on commingling union takes place in molecular proportion and not in mass. The resulting ozonid compound in the case of pinene ozonid and in cinnamic aldehyde ozonid, for example, is a solid, but on account of the extreme minuteness of the molecular aggregates it remains freely in suspension in the air and gradually assumes the true gaseous form.

The main object of this invention is the production of an ozonid, for example pinene ozonid, in gaseous form for therapeutic and technical use and the following description of the method of producing gaseous pinene ozonid, and of the apparatus therefor will make clear the method I employ in general for all gaseous ozonids.

Pinene is the bicyclic terpene, whose empirical and molecular formula is $C_{10}H_{16}$ and has one double bond. Its structural formula is now recognized to be

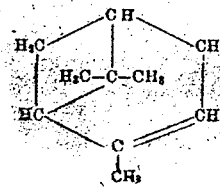

According to my invention, pinene unites with ozone to form a direct addition product to ozonid in gaseous form; the molecule of ozone unites wholly with the molecule of pinene. It is a simple direct union; there is no intermediate product or by-product of any kind.

Pinene has a high vapor tension and is completely and easily volatile below its boiling point and I take advantage of this feature to produce a saturated, water free, vapor of pinene preferably by passing a stream of dry air over the surface of pinene. Ozone, in the form of ozonized oxygen or ozonized air, I produce in the dry state, by means of an ozone generating apparatus.

Having formed a practically dry vapor of pinene and also a gaseous ozone, I produce the pinene ozonid by commingling these vapors or gases and causing them so to diffuse that their molecules come into chemical combining distance of each other and unite directly. This mechanical combining or commingling to produce the chemical union comprehends and involves no oxidizing action on the liquid pinene from which the practically dry pinene vapor is obtained, and gives a large quantity of the gaseous ozonid. The vapor of pinene is invisible, as is the gaseous ozone mixture, but the moment the invisible gases commingle an optically visible gaseous compound results. This finely suspended product is not "wet" but is made up of molecularly fine particles of a dry solid nature. This gaseous compound may be allowed to impinge upon the dry polished surface of a mirror without wetting it or depositing upon it. The compound has a high vapor tension and tends to resolve itself into an invisible gas whereby its density in a room will not visibly increase beyond a certain point. It is insoluble in all the ordinary solvents. The compound chemically is an ozonid, a direct addition product of ozone and pinene; its empirical formula is $C_{10}H_{16}O_3$. In its formation there is no by-product of $H_2O$ or $CO_2$, or of $O_2$ from the ozone. The fact that this product is a finely divided solid in suspension is further indicated by the fact that it cannot be condensed even at the temperature of liquid air; that its particles are solid at ordinary temperature. Its structural formula in the simple form is

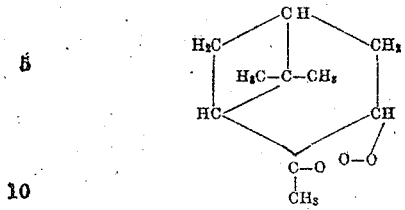

On contact with moisture the molecule splits at the point of double bending and one atom of oxygen unites with the H₂O forming H₂O₂ and leaves pinonic aldehyde.

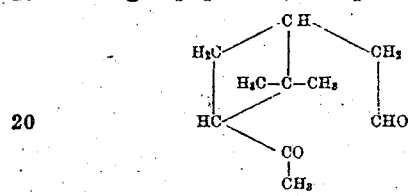

This pinonic aldehyde is so readily oxidized to pinonic acid that it is very difficult to obtain it free from the latter. The structure of pinonic acid is

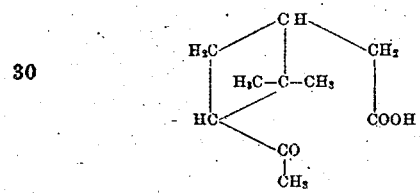

This is a liquid pitchy substance which boils at 195 degrees C. under 22 mm. pressure and at 310 degrees to 315 degrees C. under atmospheric pressure. It is slightly soluble in water.

The solid, finely divided particles of pinene ozonid, which I produce by commingling the practically dry gases is not readily decomposed at ordinary temperatures in the dry state but on contact with water, hydrogen peroxid, $H_2O_2$, is liberated, and this $H_2O_2$ reacts at once in contact with organic reducing matter and liberates oxygen nascently; also in contact with the oxyhaemoglobin of the blood, oxygen is liberated nascently and in both cases pinonic aldehyde and pinonic acid are formed. It is, therefor, important that the pinene vapor and the ozone be free from moisture before commingling. On the other hand it is important that moisture be present when it is desired to liberate oxygen nascently from the ozonid.

Gaseous pinene ozonid has been proven by me to be highly germicidal, and extended tests have been made by me and under my direction upon the pathogenic bacteria, all of which yield quickly to its germicidal action and are destroyed. It is harmless to physiologic conditions of the animal system and in acting upon the blood assists in charging it with its maximum amount of oxygen and thus promotes natural metabolism and functional activity, and all bacterial forms exposed upon the surface of the tissues with which the gaseous pinene ozonid comes into contact are destroyed. Infection of the mucous surfaces of the pulmonary tract is thus removed, and reinfection and auto-infection prevented by breathing the atmosphere in which the gaseous pinene ozonid is diffused. It is absolutely non-toxic, non-irritating and is pleasantly respirable.

One of the greatest and most beneficial actions of gaseous pinene ozonid, and a main object in its therapeutical application, is its direct powerful oxidizing action on the foreign organic matter in the blood. All infectious diseases are dangerous almost in direct ratio to the nature and quantity of the bacterial products thrown into the blood stream. The only direct manner in which nature can rid the system of these soluble or diffusible toxic substances is by oxidation and the oxidizing power of the blood is limited by the amount of the oxygen-carrying hemoglobin. When the quantity of diffusible toxic bacterial products thrown into the blood stream is greater than the oxygen of the oxy-hemoglobin can oxidize then toxemia is apparent and is idicated by the cyanosis. The diffusible toxins take up all the oxygen carried by the blood-stream and no oxygen is left for normal metabolism. Also, the oxidizing action of gaseous pinene ozonid in contact with oxy-hemoglobin is greater than the oxidizing power of gaseous pinene ozonid alone under other conditions or of oxy-hemoglobin alone. This reaction is new and is claimed in connection with its action in removing the toxicity of the blood. It is well known that when permanganate of potash, a highly saturated oxygen compound, is brought into solution or contact with hydrogen peroxid, there is an instantaneous liberation of oxygen from both compounds in the free or nascent condition, and the powerful oxidizing action of the active oxygen thus set free may be utilized. In the same manner I have found that gaseous pinene ozonid when brought into chemical contact with oxy-hemoglobin reacts in the same manner and active oxygen is liberated. If there are no foreign soluble or diffusible toxic substances in the blood the ozone or oxygen thus nascently liberated acts only physiologically but if the blood carries such toxic substances the active oxygen liberated by the gaseous pinene ozonid and the oxy-hemoglobin in situ, acts nascently upon the organic toxic substances in the blood-stream and converts them at once into their harmless end products. This action of the gaseous pinene ozonid and oxy-hemoglobin with the liberation of active oxygen in contact with the blood-stream and the oxidation and destruction of any foreign toxic substances in the blood has been demonstrated by me in the laboratory and in the clinic. Toxicity of the blood, whether caused by surgical or traumatic infection, or from any infectious condition of disease such as pyogenic toxemia in tuberculosis, streptococcal or pneumococcal toxemia, or toxemia and bacteriemia from typhoid, is quickly and positively removed by this reaction between oxyhemoglobin and pinene ozonid *in situ* in contact with or in the blood-stream. Cyanosis quickly disappears and is replaced by a natural healthy flush of arterial blood.

I have shown by actual test that the gaseous pinene ozonid is highly germicidal by direct contact with the bacterial micro-organisms and that in the lungs it is even more highly germicidal by reason of its reaction with oxy-hemoglobin.

The therapeutical application of gaseous pinene ozonid as a destroyer of the toxicity of the blood and as a germicide is not conceived by me in any sense as a "dosing" or "treatment" method, that is, it is not intended that the patient shall be given short periodical treatments or inhalations with periods between in which the bacteria may continue to multiply and the toxicity may return but a continuous application by natural respiration. Continuous antisepsis, by which is meant both germicidal action and destruction of diffusible toxins in the blood-streams, is preferably employed. For this reason the amount of gaseous pinene ozonid employed should be continuous and large, and should be diffused throughout the room or rooms occupied by the patient, and in such quantities that natural ventilation may be observed. The gaseous pinene ozonid is pleasantly respirable and produces a feeling of salubrity and buoyancy.

With the removal of the toxins in the blood-streams the temperature falls naturally to normal, the pulse becomes normal or lower, natural metabolism is restored, anorexia, dyspnoea, and nervousness are eliminated, and the immediate and continued result in a renewed strong desire for food, with sound refreshing sleep and good digestion. In tuberculosis the above beneficial results are obtained and sputum diminishes rapidly in amount, bacteria diminish until they disappear entirely on bacteriological examination, the cold sweats and hacking cough disappear quickly, and the abscesses or infected areas rapidly diminish in size until healing is complete. These results have been obtained by me in clinical tests, and in a sufficient number of cases, to prove that they resulted from the gaseous pinene ozonid and not accidentally or as the result of idiosyncracy.

The method I employ for the production of gaseous ozonids is more fully disclosed in the following description of my generator and its use in the production of gaseous pinene ozonid.

In the accompanying drawings of the generator, Figure 1 is a front view in elevation; Fig. 2 is a side view in elevation; Fig. 3 is a back view in elevation; Fig. 4 is a vertical sectional view of the ozone generating tube; Fig. 5 is a plan of the tube; Fig. 6 is a section taken at 6—6 in Fig. 4; Fig. 7 is a plan view of the base for the tube; Fig. 8 is a plan of the base of the air drying tube (Fig. 1); Fig. 9 is a vertical section taken at 9—9 in Fig. 8; Fig. 10 is a plan of the top of the air drying tube (Fig. 1); Fig. 11 is a section taken at 11—11 in Fig. 10. Fig. 12 is a plan view of the pinene evaporating tank and the gas combining chamber, with parts of the covers of the same broken away or removed to show the interior thereof.

Similar reference figures refer to similar parts in the different drawings.

In Fig. 1, is shown an air drying tube or apparatus, 1, through which all the air used in the apparatus is caused to pass. The parts of this tube are shown in detail in Figs. 8, 9, 10 and 11. Referring to Fig. 1, 2 is a glass cylinder firmly and hermetically cemented into the top and bottom castings 3 and 4 respectively. The bottom casting 4, as shown in Fig. 9, in section and in Fig. 8 in plan is pan shaped to support lumps of a dehydrating material such as fused calcium chlorid, but at the same time is perforated as at 5, to allow of the passage of an air current, and to permit of the escape of water into the jar or catch-receptacle 7.

The bottom casting 6, forms the base or support of the drying tube, but as shown in section in Fig. 9, is not rigidly attached thereto. The glass jar, 7, is the ordinary Mason jar and is used on account of the ease with which it may be replaced should it become broken; it is attached to the base casting 6, by the threaded neck 8. As will be seen by reference to Fig. 1, this arrangement permits of the easy removal of the jar when it is necessary to empty it. In Fig. 2, is shown a fan blower 9. The discharge opening or neck of this fan enters the neck of the base casting 6, at point 10 in Fig. 2. At the top of the drying tube, pipe connections 11 and 12, are provided for the discharge of the dry air from the drying cylinder 1 and in the discharge pipe 12, is shown a regulating valve 13. From this valve 13, the pipe 14 makes connection with the pinene evaporating tank 15. This evaporating tank 15, is shown in vertical section in Fig. 3, and in plan at 16 in Fig. 12. In the tank 15 are vertical ribs or partitions 17, 17 extending from the bottom to the top of the said tank, but cut away alternately at opposite ends, as shown by the arrows in Fig. 12; by which arrangement dry air entering the first passage from the air pipe 14, passes through the vertical channels formed by the ribs 17, 17 continuously until it emerges through the pinene vapor discharge 18. By this provision the air is caused to take a circuitous path back and forth over the surface of the pinene in the tank 15 and insure a saturated vapor of pinene being formed. The pinene evaporating tank 15, is partly filled with liquid pinene through the screw cap opening 19, whereby the full area or bottom of the tank is completely covered and a uniform area of evaporating surface is secured at all times. As this area of evaporating surface is large and constant, and preferably greater than necessary, a maximum amount of pinene vapor is generated, and the rate of evaporation of pinene can be regulated by controlling the air supply by the valve 13. By means of the rheostat 20, as shown in Fig. 3, the speed of the fan motor 21, may be varied, whereby the total amount of the air blown through the apparatus may also be regulated. Referring again to dry air discharge pipe 11, in Fig. 1, connection is made by means of fiber bushing 23, to an ozone generating tube 22; through this tube the dry air from pipe 11, passes downward through the air gap or space, between the dieletric walls shown in Fig. 4 and emerges by means of the discharge pipe 24, through valve 25.

In Fig. 1, is shown in front elevation the gas mixing or reaction chamber 26. This is also shown in vertical section and in elevation in Figs. 2 and 3, and in plan in Fig. 12. The object of this chamber is to cause a thorough intermingling of the dry vapor of pinene entering through pipe 18, and of ozone entering through pipe 24, whereby the pinene vapor and the ozone gas are caused to unite chemically and form the optically visible pinene ozonid product. The pinene vapor and ozone enter the chamber 28, as shown in Figs. 3 and 12, they then pass through openings 29, in the vertical wall 30; the remainder of the chamber is provided with vertical partitions 31. These partitions have openings 32, along their upper and lower edges alternating so that the pinene and the ozone are caused to pass upward and downward through the vertical spaces in direction of the arrows shown in Fig. 12, to the outlet pipe 27, and thus be thoroughly commingled to form the gaseous ozonid. From this discharge pipe 27, the pinene ozonid gas passes upward through the glass pipe 34, to the top of the machine and thence into the glass globe 35, from which it emerges into the atmosphere of the room or building. In Fig. 2, is shown an electrical transformer, 36, whereby the ordinary low voltage alternating service current may be raised to a sufficiently high voltage, approximately 10,000, sufficient to electrify the ozone tube 22.

The vapor mixing tank 26, has a flat removable cover 36', by the removal of which the interior may be readily inspected or cleaned. In order to seal the joints made by the edges of the tank 26, and the top of the ribs 30 and 31, a sheet of packing felt is placed under the cover in contact with the vertical edges. In Fig. 3, is shown a fuse plug 37, interposed between the machine circuit on the exterior service line. This fuse is preferably of lower resistance than the fuse plug in the service tine, whereby any accidental increase in resistance in the apparatus will first blow it and thus save the external circuit. At 38, in Figs. 1 and 3, is shown an external pipe connection to the inlet of the fan; to this pipe connection a pipe may be attached and extended to an outside air supply. as through a window or other opening. This is very desirable, as it supplies fresh air to the apparatus at all times and assists in ventilating the room itself.

As pointed out above, the drying tube 1, is detachable at the joint between castings 4 and 6. At 39, in Fig. 2, is shown a bushing nut 39, and by loosening this nut and bushing 23, the drying tube may be readily lifted from position for repairing or cleaning.

In Figs. 4, 5, 6, and 7 is shown the ozone generating tube I employ. It is well known that electrical discharges take place most readily from points and least readily from smooth surfaces. Electrodes with perfectly smooth, plane surfaces are undesirable for this reason, because the electric tension accumulates on such surfaces until the electric strain ruptures at some point which may be nearest to the opposing electrode and an arc or violent discharge occurs. In converting the oxygen of common air into ozone it is highly undesirable that any arcing occur, even incipient arcing, as such concentrated localized discharges cause the formation of nitrogen oxids. To attain this object I make use of a liquid electrode and a corresponding solid dielectric, whose opposing surfaces are at all points in substantially intimate contact, and in which, such surfaces in contact, consist of an exceedingly great number of fine, uniform indentations and corresponding points, all of which lie practically in a true plane. This I accomplish by making use of a glass dielectric plate or tube one of whose surfaces has been slightly, but sensibly etched or roughened by the action of hydrofluoric acid, the vapor or liquid, or by the action of a fine sand blast. Against this finely indented glass surface I place a layer of metallic mercury or other liquid conductive material, such as an acidulated solution, which will enter the indentations and conform to the surface of the roughened dielectric. The mobile conductive liquid or electrolyte in contact with the roughened surface of the dielectric thus forms an electric discharging surface with an innumerable number of fine points of discharge, and at the same time the electrode surface and the dielectric surface are in absolutely uniform intimate contact.

Referring to Fig. 4, 40 is a glass tube closed or sealed at the bottom and contracted at the top into a tubular neck 41. The interior surface of this tube, as shown at 42, is roughened preferably by means of hydrofluoric acid, 43 is a hollow, double walled tube, the inner and outer walls 44 and 45 of which are joined or sealed at the bottom, thus forming an annular cylindrical vessel. The inner surfaces of the walls constituting this annular vessel are roughened preferably by means of hydrofluoric acid, as shown at 46. The inner wall 44 of this annular cylindrical vessel 43 is contracted at the top into a dome shape with a central tubulure 47 of greater diameter than the neck 41 of the inner tube.

Fig. 7 is a plan of the base shown in vertical section in Fig. 4, said base being cup-shaped and preferabl made of porcelain. 48 is a cork or felt washer supported on an annular shoulder 48ª in said base on which washer the outer tube rests, and 49 is a similar cork or felt pad or support for the inner tube. 50 are vertical holes or passages in the base. The tubes are assembled concentrically and placed within the base. The annular space between the outer tube and the top part of the base is closed or packed by means of cotton or asbestos cord 51. The tubes are concentrically positioned with regard to each other by means of the perforated st pper, 52, which also closes the opening in the tubulure 47, and closely fits the neck 41. The tubes are filled with a conducting liquid 53, the inner tube being filled to a point higher than the outer tube so that the electric discharge will not take place from the edge of one electrolyte to the edge of the other. The liquid in both tubes, if aqueous conducting liquid is used, is covered with a film or layer of oil 53ª, preferably paraffin, so as to prevent evaporation and to act as a non-conducting cover. 54 and 55 in Figs. 4 and 5 are metallic wire connections to the conducting liquid. The wire is preferably gold or platinum and is incased in a glass tube but does not extend to the lower ends of the tubes. It is preferably stopped about one half of an inch from the end of the tube so that the glass wall of the tube will act as a non-conducting shield and prevent a direct discharge from the pointed end of the wire conductor to the dielectric wall. The conducting wire 54 in the inner tube is much longer than the wire in the outer tube whereby their ends or discharge points are widely separated, and the tendency of the current to pass directly from point to point is prevented. At the outer ends of the wires 54 and 55 loops 56 and 57 are provided. Fig. 1 and Fig. 3 show leads 58 and 59 from the high tension or secondary coils 60, and between these high tension leads, and the conducting wires 54 and 55 are flexible coiled spring wire connections 60, 61, whereby connection and disconnection to the tube may be readily made.

The operation of the apparatus and the method of producing pinene ozonid is as follows:—The evaporating tank 15 is supplied with a proper amount of pinene or ozonizable substance through the screw cap opening 9, about one half full, so that the full surface area is covered with pinene thus assuring a constant maximum area for evaporation. The valves 18, 25 and 27 are then opened and electrical connection is made by connection plug 62 from a source of alternating current supply, as for example, from a commercial lighting socket. Air is drawn by the fan blower through the pipe opening 38 and discharged through the neck 10 of the fan into the hollow base 6 of the drying cylinder 1. The air then passes upward through the interstices between the lumps of the dehydrating agent, in the glass cylinder 2. The pan shaped casting 4 supports this dehydrating material and at the same time allows the air to pass through the holes 5 shown in Fig. 8. After the air is deprived of its moisture it passes into pipes 11 and 12. A portion of the air passes through pipe 11 into the dome of the ozone tube and then downward through the air gap 63 between the dielectric walls in Fig. 4. The high tension electrical discharge passing through the air gap 63 between the dielectric walls converts a portion of the oxygen contained in the air into ozone, and the ozonized air thus produced passes downward through the openings 50 in the base of the ozone tube and thence through pipe 24 shown in Figs. 1 and 12 into the gas combining or mixing chamber 28. Through the other outlet pipe 12 from the top of the drying chamber 1, air passes through valve 13 and pipe 14, shown in Fig. 2 and enters the pinene evaporating tank 15, as shown in Figs. 2 and 12. This stream of air from pipe 14 impinges upon the surface of the pinene in the first channel made by the vertical ribs 17, and passes in a continuous manner through all of the channels until it emerges from the evaporating tank 13 through the pipe 18 shown in Figs. 1 and 12 and enters the gas combining chamber 28. The stream of dry air thus passed over the surface of the pinene evaporates the latter, and produces a saturated pinene vapor, and on intermingling in chamber 28 with the ozonized air entering through the pipe 24 combines chemically therewith by direct union and forms the optically visible gaseous pinene ozonid compound. The intermingled gases then pass through openings 29 in the vertical partition walls 30 and pass upward and downward alternately between the vertical partition walls 31 through the passages 33, by which means the gases are thoroughly diffused and intermingled and the pinene and ozone molecules brought into intimate contact so as to produce a complete chemical combination. The resulting gaseous pinene ozonid thus produced emerges through the pipe connection 27 shown in Figs. 1, 2 and 12 and passes upward into the vertical glass tube 34, and is thence carried upward to the outlet 64 at the top of the generator into the glass globe 65.

The area of the surface of the pinene in the pinene evaporating tank 15 is greater than necessary to fully saturate the air required for the operation, hence if the air supply to this tank is regulated by positioning valve 13 the exact amount of pinene vapor will be produced to combine completely and properly with the ozone in the ozonized air. The ozone produced by means of the ozone tube is practically a constant quantity as its area of electrical discharging surface and the voltage employed are constant factors. It is important that the air drying tube 1 be kept filled with an efficient dehydrating compound, as the presence of moisture in the air would tend to cause the production of nitrogen oxids in the ozone apparatus and the moisture would combine with the pinene ozonid product and cause its dissociation. The gaseous pinene ozonid produced by this intermingled and chemical union of pinene vapor and ozone appears in globe 65 as a whitish opaque vapor. It is, however, dry and entirely free from moisture and consists of extremely fine particles of the polimerized ozonid. These finely suspended particles if allowed to come to a state of rest in an inclosed space, as in globe 65, will slowly settle and leave a clear space above them. They have, however, a high vapor tension and tend rapidly to assume the gaseous state, and hence do not settle or deposit upon surfaces.

The method of application for therapeutical use is to generate the gaseous pinene ozonid in copious quantities so that the patients subjected to its action may live normally in rooms or apartments and breathe a positively germicidal atmosphere in a natural manner.

My invention is not limited to use for therapeutical purposes, but is capable of use generally where it is desired to employ an efficient germicide; that is it may be used for disinfecting and fumigating purposes generally.

The apparatus shown and described herein is made the subject of a separate application filed by me March 11, 1912, Serial No. 683,118.

What I claim and desire to secure by Letters Patent of the United States is:—

1. The process of producing gaseous ozonids which consists in commingling a vapor of a substance to be ozonized, and ozone out of contact with the body of said substance.

2. The process of producing gaseous ozonids, which consists in forming a vapor of the substance to be ozonized, and commingling said vapor and ozone.

3. The process of producing gaseous ozonids, which consists in forming a saturated vapor of the substance to be ozonized, and commingling said vapor and ozone.

4. The process of producing gaseous ozonids, which consists in evaporating an ozonizable substance, and commingling the vapor so formed and ozone.

5. The process of producing gaseous ozonids, which consists in evaporating an ozonizable substance, and commingling the vapor so formed and ozone out of contact with the body of said ozonizable substance.

6. The process of producing gaseous ozonids, which consists in evaporating an ozonizable substance by passing the current of air over the surface of said substance, and subsequently commingling the vapor so formed and ozone.

7. The process of producing gaseous ozonids, which consists in evaporating an ozonizable substance by passing a current of air over the surface of said substance, and subsequently commingling the vapor so formed and ozone out of contact with the body of said ozonizable substance.

8. The process of producing gaseous ozonids, which consists in evaporating an ozonizable substance by dry air, and commingling the vapor so formed and ozone.

9. The process of producing gaseous ozonids, which consists in evaporating an ozonizable substance by air, and commingling the vapor so formed and dry ozone.

10. The process of producing gaseous ozonids, which consists in evaporating an ozonizable substance by dry air, and commingling the vapor so formed and dry ozone.

11. The process of producing a gaseous ozonid, which consists in converting an ozonizable liquid into a vapor and subsequently intermingling this vapor with ozone.

12. The process of producing a gaseous ozonid, which consists in converting an ozonizable liquid into a vapor and subsequently intermingling this vapor with ozone out of contact with said liquid.

13. The process of making gaseous pinene ozonid, which consists in bringing the vapor of pinene and gaseous ozone into direct chemical union by intermingling.

14. The process of making gaseous pinene ozonid, which consists in evaporating pinene, and intermingling the pinene vapor with ozone.

15. The process of making gaseous pinene ozonid, which consists in evaporating pinene at one point and intermingling the pinene vapor so formed with ozone in the gaseous state at another point.

16. The process of making pinene ozonid, which consists in passing a current of air over the surface of pinene at one point to produce a vapor of pinene, generating ozone at another point, and bringing said vapor and the ozone into chemical union by commingling at a third point.

In testimony whereof I have hereunto signed my name in the presence of two subscribing witnesses.

WILLIAM JOHN KNOX.

Witnesses:
M. E. McNINCH,
C. G. HEYLMUN.